United States Patent

[11] 3,563,344

| [72] | Inventors | Vladimir Nikolaevich Veller<br>Autozavodskaya ulitsa, 9/1, kv. 137;<br>Alexandr Petrovich Zharov, Simonovsky<br>val. 22, korpus 2, kv. 31, Moscow, U.S.S.R. |
|------|-----------|---|
| [21] | Appl. No. | 777,041 |
| [22] | Filed | Nov. 19, 1968 |
| [45] | Patented | Feb. 16, 1971 |

[54] DEVICE FOR SUPPLYING LUBRICANT INTO SELF-LUBRICATING SLIDING FRICTION BEARINGS
5 Claims, 1 Drawing Fig.

[52] U.S. Cl. ............................................. 184/6,
184/104, 308/133
[51] Int. Cl. .............................................. F16n 7/40
[50] Field of Search ........................................ 184/6 (D),
6, 103, 104; 308/133

[56] References Cited
UNITED STATES PATENTS

| 1,977,959 | 10/1934 | Watts | 308/133X |
|-----------|---------|-------|----------|
| 2,158,810 | 5/1939 | Wilson | 308/133 |
| 2,158,835 | 5/1939 | Schmidt | 308/133X |
| 2,460,814 | 2/1949 | Duerr, Jr. | 184/103X |
| 2,664,173 | 12/1953 | Karig | 184/104X |
| 2,979,161 | 4/1961 | Lyden | 184/103 |

FOREIGN PATENTS

| 758,758 | 10/1956 | Great Britain | 308/133 |

*Primary Examiner*—Manuel A. Antonakas
*Attorney*—Waters, Roditi, Schwartz & Nissen ABSTRACT: A self-lubricating bearing system comprises a series-connected drain tank, pumps, pressure piping and a reservoir. Said reservoir being disposed in the lower portion of the bearing casing is characterized by the employment of an additional duct communicating the piping with a space between the journal of the shaft and the hub in the nonloaded portion of the bearing. The employment of the present invention makes it possible to completely eliminate the danger of the breakdown of the bearing and the unit caused by the stoppage of the supply of lubricant into the bearing.

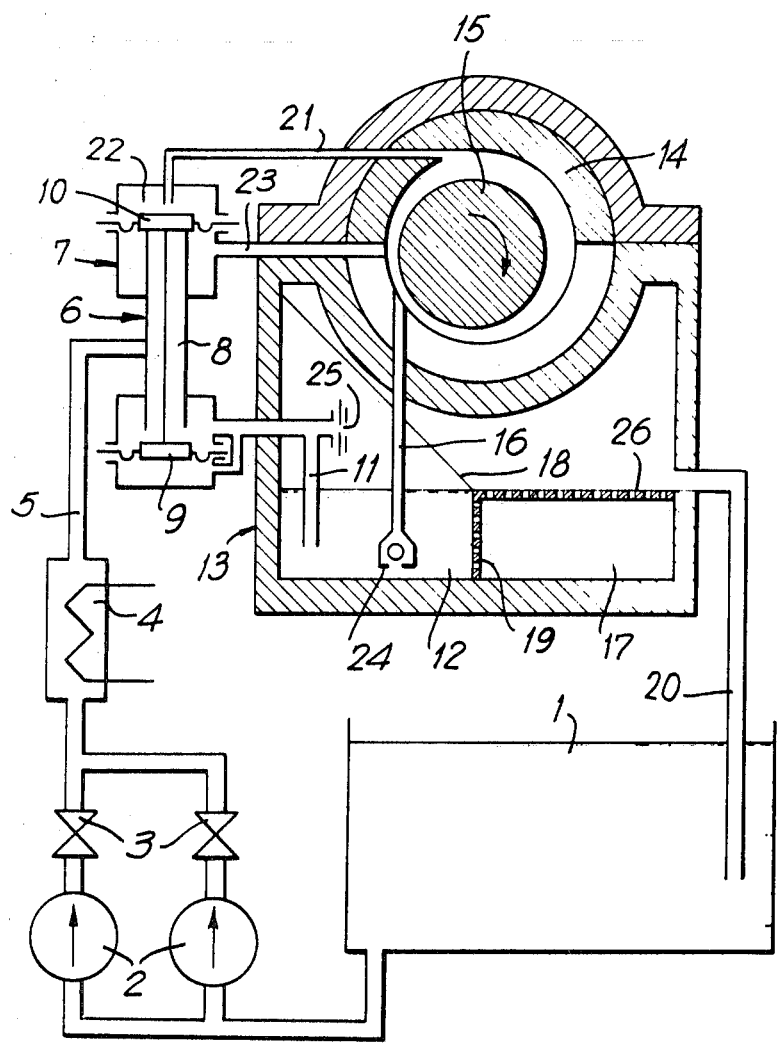

DEVICE FOR SUPPLYING LUBRICANT INTO SELF-LUBRICATING SLIDING FRICTION BEARINGS

The present invention relates to sliding friction bearings and, more particularly, to devices for supplying lubricant into self-lubricating sliding friction bearings.

Known in the prior art are devices used for the above purpose, said devices comprising a closed circuit of circulation, consisting of a series-connected drain tank, pumps, pressure piping and a reservoir, the latter being disposed in the lower portion of the bearing casing from which the bearing is self-lubricated.

The known devices, however, do not ensure reliable supply of lubricant into bearings. This is explained by the fact that, in case the condition of self-lubricating is violated, the supply of lubricant into the bearing discontinues, which may result in the breakdown or damage of not only the bearing but of the whole unit as well.

In case the supply of lubricant from the pressure piping into the reservoir of the bearing casing is discontinued, the lubricant reserved in the reservoir will be consumed and this will eventually also lead to an emergency situation.

Because of the above-given reasons the known devices may be employed only in mechanisms which are not required to be highly reliable, and in small-power machines.

It is an object of the present invention to obviate the above-mentioned disadvantages.

The invention relates to the problem of providing a device which is self-lubricating and serviced by a forced supply of lubricant by a pump, and which would provide a constant reserve of the lubricant to the bearing.

This problem is solved, according to the invention, by providing a device for supplying lubricant to a self-lubricating sliding friction bearing, comprising a closed circuit of circulation consisting of a series-connected drain tank, pumps, pressure piping and a reservoir, the latter being disposed in the lower portion of the bearing casing from which the bearing is self-lubricated, wherein the space between the hub of the bearing and the journal of the shaft is connected by means of an additional duct to the pressure piping supplying lubricant into said reservoir, the outlet of said duct into said space being disposed in the nonloaded portion of the bearing.

It is expedient to dispose the outlet of the additional duct in the portion of said space which expands in the direction of the rotation of the shaft, and to connect the additional duct with the pressure piping by means of an arrangement automatically shifting the supply of lubricant from said duct in case the lubricant pressure in the space between the journal of the shaft and the hub of the nonloaded portion of the bearing drops.

It is also expedient to arrange the shifting arrangement as a three-way valve actuated by a drop of the lubricant pressure in the pressure piping and said space of the nonloaded portion of the bearing.

It is advisable to employ a three-way valve comprising a chamber used for supplying lubricant from the pressure piping and two rigidly-interconnected locks, one of which, with the bearing operating under self-lubricating conditions, passes lubricant from the chamber into the reservoir of the lower portion of the bearing casing, and the other, passes lubricant into the additional duct when self-lubrication is discontinued and the pressure in the space between the journal of the shaft and the hub of the bearing drops, said space being connected by means of a pulse tube to an additional chamber disposed above the latter lock.

The employment of the present invention makes it possible to completely eliminate the danger of the breakdown of the bearing and of the unit, resulting from discontinuation of the supply of lubricant into the bearing.

The following description of an exemplary embodiment of the invention is given with reference to the accompanying drawing showing a diagram of the device used for supplying lubricant into a self-lubricating sliding friction bearing.

From a drain tank 1 by means of a pump 2 (the pump group consists of an operating and a reserve pumps) lubricant is delivered through nonreturn valves 3 and a cooler 4 along pressure piping 5 to a shifting arrangement 6.

The shifting arrangement 6 is essentially a controlled three-way valve in whose housing 7 is arranged a chamber 8 used for supplying lubricant, and two rigidly interconnected locks 9 and 10.

With the device operating under self-lubricating conditions, the lock 9 passes lubricant from the chamber 8 along a piping 11 into a reservoir 12 disposed in the lower portion of the bearing casing 13. With the shaft rotating, a vacuum is created in a portion of the space between a hub 14 and the shaft journal 15, said vacuum causing lubricant to flow from the reservoir 12 along a pipe 16.

Used lubricant is drained, for instance, through the bearing butt ends into an additional reservoir 17, also disposed in the lower portion of the bearing casing 13 and separated from the reservoir 12 by means of an inclined partition 18 and a screen partition 19. The partition 18 is inclined to preclude the excessive frothing of used lubricant while the latter is drained into the additional reservoir 17. The screen partition 19 is used for communicating the additional reservoir 17 with the reservoir 12.

Used lubricant is delivered from the additional reservoir 17 along a pipe 20 into the drain tank 1. The inlet portion of the pipe 20 is disposed so as to maintain a constant level of lubricant in the lower portion of the bearing casing 13.

In case the condition of self-lubricating is violated, the pressure in the space between the hub 14 of the bearing and the journal 15 of the shaft in the nonloaded portion of the bearing drops, as a result of which the pressure in an additional chamber 22, connected with this portion of the bearing by means of a pulse tube 21, drops as well. Under the action of the pressure drop in the chambers 8 and 22, the lock 10 passes lubricant through an additional duct 23 into the space between the hub 14 and the journal 15 of the shaft of the nonloaded portion of the bearing.

To prevent the intaking device from having an adverse effect on the bearing operation during forced lubrication, the pipe 16 has a nonreturn valve 24 mounted thereon and closed under these conditions. During an emergency stoppage of the pump 2, the pressure of lubricant in the pressure piping 5 and the chamber 8 of the valve 6 drops down to zero.

To prevent lubricant from flowing under the action of syphon from the reservoir 12 along the pipings 11 and 5 into the drain tank 1, the upper portion of the piping 11 has an aperture 25 made therein. Under normal conditions a small additional amount of lubricant is supplied through this aperture into the reservoir 12. With the supply of lubricant from the pump 2 discontinued, some air gets into the piping 11 through the aperture 25, thus preventing syphon action.

The lubricant reserved in the reservoirs 12 and 17 makes it possible for the unit to operate until the normal conditions are restored, and allows it to be stopped without any breakdown.

To prevent frothed lubricant from passing from the additional reservoir 17 into the reservoir 12, the partition 19 is made from a net with the mesh size no less than 0.24 mm, or from a perforated sheet. The net 26 is used for smoothing the upper layer of lubricant in the additional reservoir 17.

The present invention is not limited to the aforedescribed exemplary embodiment and may have variations falling within the scope of the invention as defined in the accompanying claims.

We claim:

1. A device for supplying lubricant into a self-lubricating bearing comprising a casing including an upper and a lower portion, said upper portion supporting a hub including a shaft journal inserted therein and annularly spaced therefrom and defining a loaded portion and a nonloaded portion, said device comprising a drain tank, a pump, pressure piping and a reservoir connected in series to one another, said reservoir being disposed in the lower portion of said casing, a duct extending from said reservoir to said hub and communicating said reservoir with said shaft journal for providing self-lubrication of lubricant from said reservoir, said pump and said duct being connected in series and operable for simultaneously providing lubricant to said shaft journal, and an additional duct communicating said shaft journal with said pressure piping, said additional duct including an outlet portion communicating with said shaft journal in the nonloaded portion of the bearing.

2. A device as claimed in claim 1, wherein said outlet of said additional duct is disposed in the portion of the annular space between the hub and the shaft journal expanding in the direction of the shaft rotation.

3. A device as claimed in claim 1, wherein said additional duct is connected with said pressure piping by means for shifting the supply of the lubricant from the piping to said additional duct when the pressure of the lubricant in said space between the hub and the shaft journal in the nonloaded portion of the bearing drops.

4. A device as claimed in claim 3, wherein said means for shifting is essentially a three-way valve actuated by a pressure drop of the lubricant in both said pressure piping and said annular space of the nonloaded portion of said bearing.

5. A device as claimed in claim 4, wherein said three-way valve comprises means defining a chamber for supplying lubricant from said pressure piping and two rigidly interconnected locks, one of which locks passes the lubricant from said chamber into said reservoir of the lower portion of said casing when the device operates under self-lubricating conditions, and the other of which locks passes lubricant into the additional duct when self-lubrication is discontinued and the pressure in said annular space between the shaft journal and the hub of the bearing drops, and further including a pulse tube for communicating said annular space with said chamber.